No. 616,898. Patented Jan. 3, 1899.
W. H. CHAFFEE.
CUTTER HEAD.
(Application filed Aug. 28, 1897.)
(No Model.)
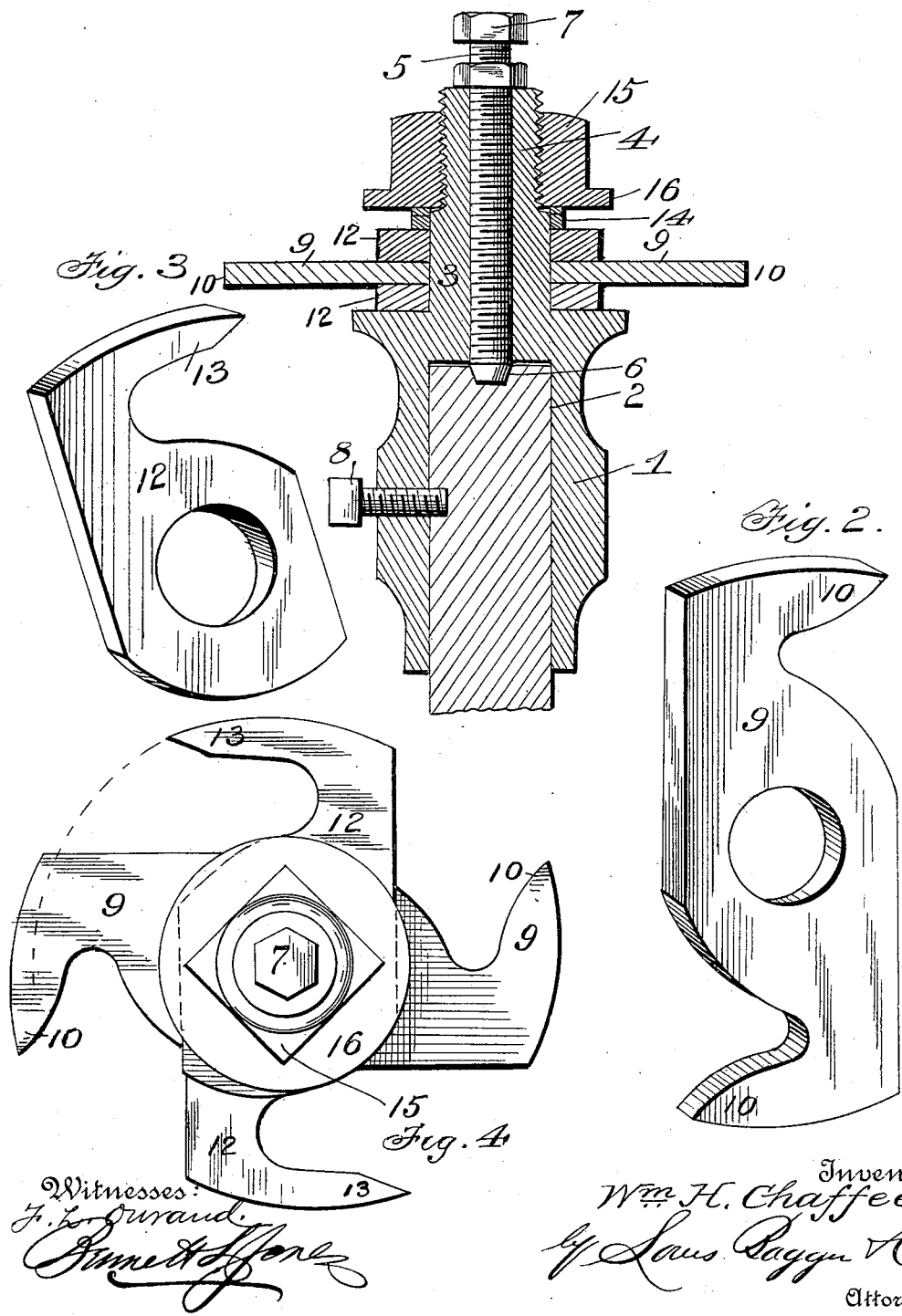

UNITED STATES PATENT OFFICE.

WILLIAM H. CHAFFEE, OF SHERBURNE, NEW YORK.

CUTTER-HEAD.

SPECIFICATION forming part of Letters Patent No. 616,898, dated January 3, 1899.

Application filed August 28, 1897. Serial No. 649,846. (No model.)

*To all whom it may concern:*

Be it known that I, WILLIAM H. CHAFFEE, a citizen of the United States, and a resident of Sherburne, in the county of Chenango and State of New York, have invented certain new and useful Improvements in Cutter or Matcher Heads; and I do hereby declare that the following is a full, clear, and exact description of the invention, which will enable others skilled in the art to which it appertains to make and use the same, reference being had to the accompanying drawings, which form a part of this specification.

My invention relates to rotary cutter or matcher heads for tongue-and-grooving machines; and its object is to provide an improved construction of the same, which shall possess superior advantages with respect to efficiency in use.

The invention consists in the novel construction and combination of parts hereinafter fully described and claimed.

In the accompanying drawings, Figure 1 is a longitudinal sectional view of a cutter or matcher head constructed in accordance with my invention. Fig. 2 is a perspective view of the center cutter removed. Fig. 3 is a similar view of one the side cutters. Fig. 4 is an end view of the cutter or matcher head.

In the said drawings, the reference-numeral 1 designates the cutter-head, formed with a socket 2 to receive the mandrel, by which it is rotated. This mandrel at its inner end is formed with a central conical recess. At its opposite end said cutter-head is formed with a cylindrical spindle 3, the outer end of which is formed with screw-threads 4. This spindle is bored out centrally from end to end and screw-threaded to receive a correspondingly-threaded pin 5, which passes therethrough and the inner end of which engages with a corresponding recess 6 in the end of the mandrel. The outer end of this screw or pin is provided with an angular portion 7 to receive a wrench for turning the same. This pin is formed with a conical inner end $5^a$, which fits in the conical recess 6 and accurately centers the head on the mandrel. A set-screw 8 passes through the head and engages with a threaded recess in the mandrel to prevent turning of the head on the latter.

The numeral 9 designates a central cutter consisting of a metal plate having a central hole or opening through which the spindle 3 passes and formed at each end with cutting-bits 10. At each side of this central bit is a cutter 12, having an opening in one end for the passage of the spindle and at the other end formed with a cutting-bit 13.

The numeral 14 designates washers, and 15 a nut fitting on the screw-threaded end of the spindle and provided with a flange 16. This nut screws on the spindle in a direction opposite to the plane of rotation of the head, so that any tendency toward a backward movement of the cutters caused by the blow in striking the board will tighten the nut.

In practice the side cutters are placed on the spindle at right angles to the center cutter, so that they will follow the latter instead of cutting at the same time therewith.

In Fig. 1 the center head is arranged to cut a groove in the board. In this instance the central cutter cuts the groove while the side cutters trim or plane off the edges. To cut a tongue on the opposite edge, the central cutter is removed and replaced by a similar one but of smaller diameter, so that the side cutters will cut the sides of the tongue and the central cutter plane off the edge thereof.

Having thus fully described my invention, what I claim is—

In a cutter-head, the combination with the screw-threaded spindle formed with a cylindrical socket and a screw-threaded bore, the screw-pin passing through said spindle having a conical inner end, the mandrel having a conical recess with which said pin engages, the nut on said pin and the set-screw passing through said spindle and engaging with a threaded hole in the mandrel, of the central cutter having a central hole and bit at each end lying in the same plane but pointing in the opposite directions, the side cutters having a central hole at one end and a bit at the other end oppositely arranged with respect to each other, the clamping-nut on said spindle and the washers, substantially as described.

In testimony that I claim the foregoing as my own I have hereunto affixed my signature in presence of two witnesses.

WILLIAM H. CHAFFEE.

Witnesses:
GEORGE M. MATTESEN,
WILLIAM A. RAYMOND.